US010394480B2

(12) United States Patent
Tsuruya et al.

(10) Patent No.: US 10,394,480 B2
(45) Date of Patent: Aug. 27, 2019

(54) STORAGE DEVICE AND STORAGE DEVICE CONTROL METHOD

(71) Applicant: HITACHI, LTD., Tokyo (JP)

(72) Inventors: Masahiro Tsuruya, Tokyo (JP); Ryo Hanafusa, Tokyo (JP); Osamu Kawaguchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/769,418

(22) PCT Filed: Jan. 22, 2016

(86) PCT No.: PCT/JP2016/051783
§ 371 (c)(1),
(2) Date: Apr. 19, 2018

(87) PCT Pub. No.: WO2017/126096
PCT Pub. Date: Jul. 27, 2017

(65) Prior Publication Data
US 2018/0314426 A1    Nov. 1, 2018

(51) Int. Cl.
*G06F 3/06* (2006.01)
*G06F 12/04* (2006.01)
*G06F 12/10* (2016.01)
*G06F 12/02* (2006.01)

(52) U.S. Cl.
CPC ............ *G06F 3/064* (2013.01); *G06F 3/0608* (2013.01); *G06F 3/0631* (2013.01);
(Continued)

(58) Field of Classification Search
CPC ...... G06F 3/064; G06F 3/0608; G06F 3/0631; G06F 3/0659; G06F 3/0679; G06F 12/04;
(Continued)

(56) References Cited

U.S. PATENT DOCUMENTS 8,631,052 B1 *   1/2014  Shilane .............. G06F 16/1748
                                                    707/825
8,862,805 B2    10/2014  Yamamoto et al.
(Continued)

OTHER PUBLICATIONS

International Search Report of PCT/JP2016/051783 dated Feb. 16, 2016.

*Primary Examiner* — Hiep T Nguyen
(74) *Attorney, Agent, or Firm* — Mattingly & Malur, PC

(57) ABSTRACT

It is possible to prevent unoccupied blocks from being depleted by a write of logical-physical management information. A processor is capable of performing an unoccupied user block generation process by moving user data stored in allocated user blocks in order to generate unoccupied user blocks serving as unoccupied blocks among allocated user blocks, and performing an unoccupied meta block generation process by moving meta data stored in allocated meta blocks in order to generate unoccupied meta blocks serving as unoccupied blocks among the allocated meta blocks. The processor calculates the number of unoccupied meta blocks to be consumed, that is, the number of unoccupied meta blocks to be consumed by the unoccupied user block generation process. The processor performs the unoccupied meta block generation process based on the number of unoccupied meta blocks to be consumed.

13 Claims, 17 Drawing Sheets

(52) U.S. Cl.
CPC .......... *G06F 3/0659* (2013.01); *G06F 3/0679* (2013.01); *G06F 12/0246* (2013.01); *G06F 12/04* (2013.01); *G06F 12/10* (2013.01); *G06F 2212/1044* (2013.01); *G06F 2212/401* (2013.01); *G06F 2212/7201* (2013.01); *G06F 2212/7204* (2013.01); *G06F 2212/7207* (2013.01); *G06F 2212/7209* (2013.01)

(58) Field of Classification Search
CPC .................. G06F 12/0246; G06F 12/10; G06F 2212/1044; G06F 2212/7201; G06F 2212/401; G06F 2212/7204; G06F 2212/7207; G06F 2212/7209
USPC ......................................................... 711/103
See application file for complete search history.

(56) References Cited

U.S. PATENT DOCUMENTS

| | | | |
|---|---|---|---|
| 2010/0174847 A1* | 7/2010 | Paley | G06F 12/0246 711/103 |
| 2011/0022778 A1* | 1/2011 | Schibilla | G06F 12/0246 711/103 |
| 2011/0320685 A1* | 12/2011 | Gorobets | G06F 12/0246 711/103 |
| 2013/0121075 A1* | 5/2013 | Hutchison | G11C 11/5628 365/185.11 |
| 2015/0363327 A1* | 12/2015 | Chaitanya | G06F 3/0608 711/103 |
| 2017/0017588 A1* | 1/2017 | Frid | G06F 13/18 |

* cited by examiner

FIG.4

| LOGICAL PAGE # | STATUS | PHYSICAL ADDRESS | SIZE | SUBSET # |
|---|---|---|---|---|
| 0 | VALID | A | 4 | 0 |
| 1 | VALID | B | 2 | |
| 2 | UNALLOCATED | - | - | |
| ... | ... | ... | ... | ... |

L2P TBL

FIG.5

| L2P TBL SUBSET # | STATUS | STORAGE PLACE | SUBSET ADDRESS |
|---|---|---|---|
| 0 | VALID | MAIN MEMORY | P |
| 1 | VALID | FM | Q |
| 2 | UNALLOCATED | - | - |
| ... | ... | ... | ... |

L2P TBL MANAGEMENT TBL

FIG. 8

| BLOCK # | STATUS | DATA TYPE | VALID DATA PERCENTAGE | FM LIFE INFORMATION |
|---|---|---|---|---|
| 0 | VALID (CLOSE) | USER | 80 % | XXXX |
| 1 | VALID (OPEN) | META | 50 % | YYYY |
| 2 | UNOCCUPIED | META | - | ZZZZ |
| ... | ... | ... | ... | ... |

BLOCK MANAGEMENT TBL

FIG. 9

| # | ITEM NAME | VALUE |
|---|---|---|
| 0 | MAXIMUM LOGICAL CAPACITY | 25600.0 GB |
| 1 | TOTAL FM CAPACITY | 4000.0 GB |
| 2 | MAIN MEMORY META CAPACITY | 3.2 GB |
| 3 | VALID LOGICAL DATA SIZE | 4000.0 GB |
| 4 | USER DATA SIZE | 2000.0 GB |
| 5 | META DATA SIZE | 4.0 GB |
| 6 | VALID USER BLOCK COUNT | W |
| 7 | UNOCCUPIED USER BLOCK COUNT | X |
| 8 | VALID META BLOCK COUNT | Y |
| 9 | UNOCCUPIED META BLOCK COUNT | Z |

0212

0800, 0801, 0802, 0803, 0804, 0805, 0806, 0807, 0808, 0809

DEVICE INFORMATION TBL

FIG. 10

| GENERATION # 0900 | UPDATE DATE AND TIME 0901 | USER DATA SIZE 0902 | META DATA SIZE 0903 | FM WRITE RATIO 0904 | USER WRITE TENDENCY 0905 |
|---|---|---|---|---|---|
| 0 | 150101 00:00:00 | 2000.0 GB | 6.4 GB | 1000:1 | 128 kB LENGTH SEQUENTIAL |
| 1 | T1 | 2000.5 GB | 6.4 GB | 1000:1 | 128 kB LENGTH SEQUENTIAL |
| ... | ... | ... | ... | ... | ... |
| N | TN | 3000.0 GB | 16.0 GB | 1:5 | 4 kB LENGTH RANDOM |
| ... | ... | ... | ... | ... | ... |

STATISTICAL INFORMATION TBL 0213

STORAGE DEVICE AND STORAGE DEVICE CONTROL METHOD

TECHNICAL FIELD

The present invention relates to a storage device.

BACKGROUND ART

In a storage device and a computer, a hard disk drive (HDD) is generally used as a physical storage medium. In recent years, however, a physical storage medium (e.g., a solid-state drive (SSD)) having a flash memory (FM) is widely used as a new physical storage medium that supersedes the HDD. The SSD mainly includes one or more than one FM chip and a controller for controlling the FM chip, and is advantageous in that it performs an I/O process far more rapidly than the HDD. However, in order to achieve such rapidity, it is necessary to use a control technology appropriate for FM characteristics.

The FM (typically a NAND-type FM) erases data in a unit called "block" (block erasure), and reads and writes data in a unit called "page." A block is a set of a predetermined number of pages. The time required for block erasure is one order of magnitude longer than required for block read and write operations. The terms "block(s)" and "page(s)" hereinafter denote the block(s) and page(s) of the FM unless otherwise stated.

Because of FM characteristics, a page storing data cannot be overwritten with new data. Therefore, in order to rewrite the data on the page, it is necessary to erase a relevant block and then write new data. Accordingly, before erasing a block, it is necessary to copy valid data in the block to another block. Thus, a longer period of time is required for rewriting data than writing into an unused area available upon block erasure. Consequently, it is necessary to reduce the time required for a data rewrite or prevent a higher-level device from recognizing an increase in response time.

In order to reduce the above-mentioned time required for a data rewrite, a method of additionally writing data to an unused area is employed for rewriting data into the FM. Thus, the SSD includes a logical address space to be provided to a higher-level device and a physical address space corresponding to each FM page. The logical address space and the physical address space are mapped by using individual address correspondence information (logical-physical management information). A process of referencing the logical-physical management information and acquiring a corresponding physical address from a logical address is referred to as logical address-physical address conversion (logical-to-physical conversion). This process is implemented by a controller incorporated in the SSD.

Read and write operations to the FM in the SSD will now be described briefly. In a read operation, in order to identify the physical address where requested data is stored, the SSD references logical address-physical address management information (logical-physical management information) and performs logical-to-physical conversion. Subsequently, based on the physical address derived from logical-to-physical conversion, the SSD acquires the requested data from the FM. In a write operation, the SSD writes write data into an unused area available upon FM block erasure. Subsequently, in the logical-physical management information, the SSD updates a physical address associated with a requested logical address to a physical address of newly written data (performs a logical-physical update). If, in this instance, an unoccupied block, that is, a block erased and writable, is not available, a process of acquiring an unoccupied block needs to be performed because the SSD cannot perform a write.

A process called "reclamation (or garbage collection)" (hereinafter abbreviated to RCM) is performed to acquire an unoccupied block. In a reclamation process, a completely invalid block, that is, an erasable block filled with invalid data, is prepared by moving only valid data from a written block to another block (rewriting). It should be noted that an unoccupied block is necessary for the reclamation process. Therefore, if no unoccupied block is available, the SSD cannot continue with an I/O operation. Such deadlock in FM resource allocation is called the "depletion of unoccupied blocks."

Consequently, the SSD makes it possible to perform a continuous I/O operation by considering the number of unoccupied blocks necessary for RCM and adjusting the amount of data to be moved by RCM (hereinafter referred to as the RCM amount) as needed to maintain the required number of unoccupied blocks. Further, the logical-physical management information needs to be accessed when a read or write operation to the FM in the SSD or an RCM operation is to be performed. Therefore, the SSD caches the whole logical-physical management information, which is stored in the FM, in a main memory, such as a high-speed dynamic random-access memory (DRAM), in order to reduce the processing overhead involved in accessing the logical-physical management information.

Due to the above-described technology, the SSD is superior to the HDD in performance. However, the SSD is more expensive than the HDD in terms of the price per unit capacity (bit cost). Therefore, a known technology described, for example, in Patent Document 1 reduces the bit cost by using a data compression or other data reduction function.

PRIOR ART DOCUMENT

Patent Document

Patent Document 1: U.S. Pat. No. 8,862,805

SUMMARY OF THE INVENTION

Problem to be Solved by the Invention

For the SSD, the size of the logical-physical management information is determined by the size of the logical address space. Therefore, an SSD having the data compression or other data reduction function has a larger logical address space than an SSD having no data reduction function, and has several to several ten times the logical-physical management information of the SSD having no data reduction function. In this instance, the SSD cannot cache all the logical-physical management information in the main memory. Further, if the logical-physical management information not storable in the main memory is stored in the FM, the logical-physical management information is read from and written into the FM. This may result in the depletion of unoccupied blocks.

Means for Solving the Problem

In order to solve the above problems, according to an aspect of the present invention, there is provided a storage device including a main memory, a nonvolatile semiconductor memory, and a processor connected to the main memory and the nonvolatile semiconductor memory. The processor stores in the nonvolatile semiconductor memory at least part of meta data indicative of the relationship between a logical address provided to a higher-level device and a physical address of user data in the nonvolatile semiconductor memory, and stores part of the meta data in the main memory. The processor allocates blocks in the nonvolatile semiconductor memory as allocated user blocks for storing the user data and as allocated meta blocks for storing the meta data. The processor is capable of performing an unoccupied user block generation process and an unoccupied meta block generation process. The unoccupied user block generation process moves user data stored in the allocated user blocks in order to generate unoccupied user blocks, namely, unoccupied blocks among the allocated user blocks. The unoccupied meta block generation process moves meta data stored in the allocated meta blocks in order to generate unoccupied meta blocks, namely, unoccupied blocks among the allocated meta blocks. The processor calculates the number of unoccupied meta blocks to be consumed, that is, the number of unoccupied meta blocks to be consumed by the unoccupied user block generation process. The processor performs the unoccupied meta block generation process based on the number of unoccupied meta blocks to be consumed.

Effect of the Invention

It is possible to prevent unoccupied blocks from being depleted by a write of logical-physical management information.

BRIEF DESCRIPTION OF DRAWINGS

FIG. 4 is a diagram illustrating an exemplary configuration of an L2P TBL 0209.

FIG. 5 is a diagram illustrating an exemplary configuration of an L2P TBL management TBL 0210.

FIG. 8 is a diagram illustrating an exemplary configuration of a block management TBL 0211.

FIG. 9 is a diagram illustrating an exemplary configuration of a device information TBL 0212.

FIG. 10 is a diagram illustrating an exemplary configuration of a statistical information TBL 0213.

MODES FOR CARRYING OUT THE INVENTION

An embodiment will now be described with reference to the accompanying drawings. It is assumed that the present embodiment is applied to an SSD having a data compression function. However, the present embodiment is also applicable to an SSD that does not have the data compression function but requires the management of meta data that cannot be completely stored in a main memory. Further, the present embodiment is merely an example that implements the present invention, and does not limit the technical scope of the present invention.

In the following description, the expression "xxx table" is occasionally used to explain about various information. However, various information may alternatively be expressed by using a data structure other than a table. In order to indicate that "xxx table" is not dependent on a data structure, "xxx table" may be referred to as "xxx information."

In the following description, a number is used as identification information for identifying an element (e.g., L2P TBL). However, a different type of identification information (e.g., name or identifier) may alternatively be used.

When a process is subsequently described by using the term "program" as a subject, it may be said that the process is performed by a controller or a processor. The reason is that a program is executed by a processor (e.g., a central processing unit (CPU)) included in a controller (storage controller or SSD controller) in order to perform a predetermined process by appropriately using a storage resource (e.g., memory) and/or a communication interface device (e.g., communication port). The controller may include a hardware circuit that performs a part or the whole of the process. A computer program may be installed from a program source. The program source may be a program distribution server or a computer-readable storage medium.

In the following description, the units of period or time are not limited. For example, the unit of period or time can be expressed by one unit or a combination of two or more units selected from among year, month, day, hour, minute, and second.

In the following description, it is assumed that a nonvolatile semiconductor storage medium included in an SSD is a flash memory (FM). It is assumed that the flash memory is typically a NAND-type flash memory that is to be erased in the unit of a block and read/written in the unit of a page. However, a flash memory other than a NAND-type flash memory, such as a NOR-type flash memory, may alternatively be used. Further, instead of a flash memory, a different type of nonvolatile semiconductor storage medium, such as a phase-change memory, may be used.

Figure 1:
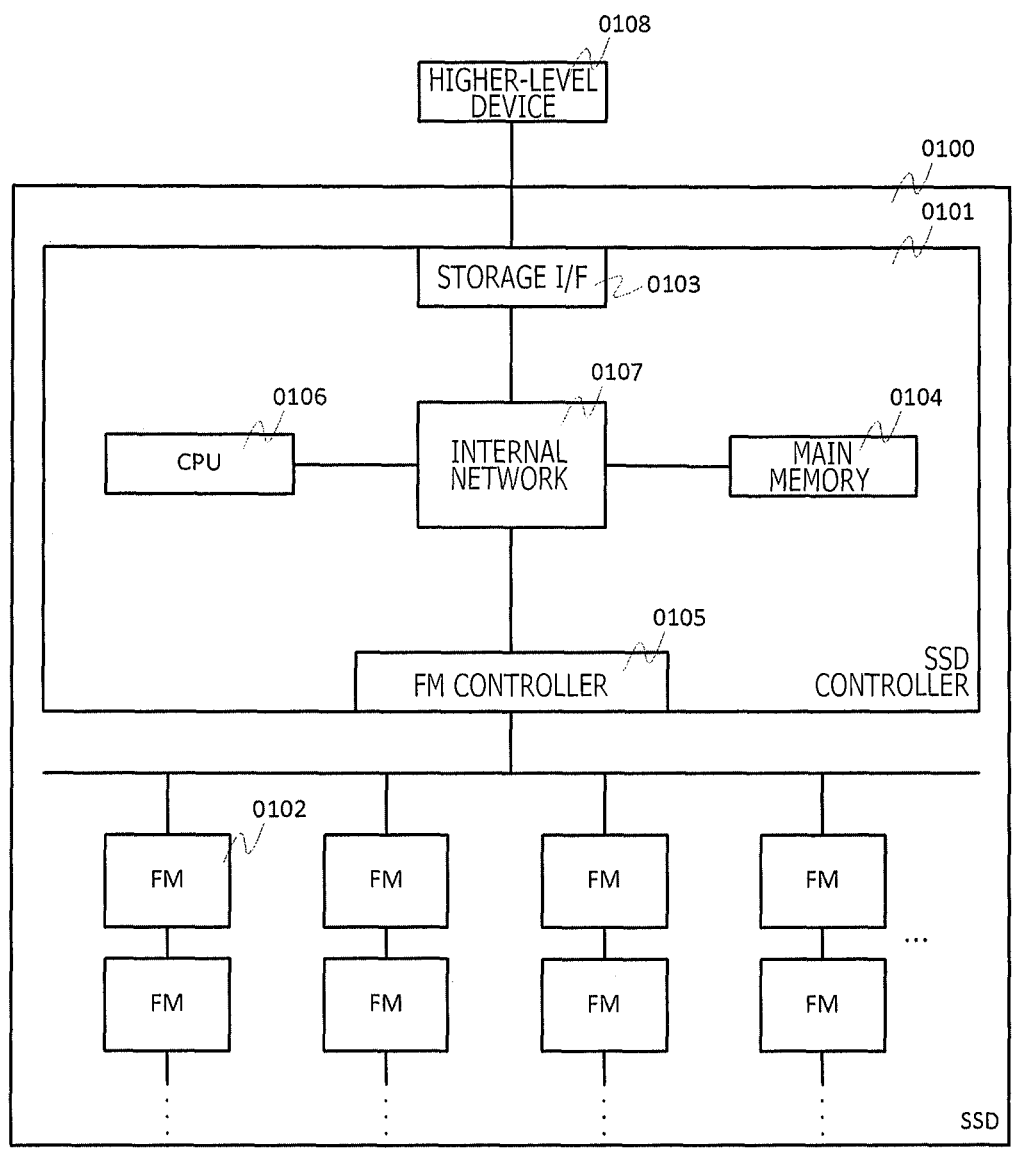
FIG. 1 is a diagram illustrating an exemplary configuration of an SSD 0100.

FIG. 1 is a diagram illustrating an exemplary configuration of an SSD 0100.

The SSD 0100 includes an SSD controller 0101 and one or more than one FM 0102. The SSD controller 0101 controls the operation of the SSD 0100. The SSD controller 0101 includes a storage I/F 0103, a main memory 0104, an FM controller 0105, and a CPU 0106. The storage I/F 0103 is an interface that provides connection to a higher-level device 0108. The FM controller 0105 controls the FM. The elements included in the SSD controller 0101 are interconnected through an internal network 0107.

The higher-level device 0108 is an example of a device that uses the SSD 0100, and may be, for example, an application server, a storage device, or a storage controller.

The CPU 0106 is a processor that provides overall control of the SSD controller 0101 and operates based on a microprogram stored in the main memory 0104. The FM controller 0105 is controlled by the CPU 0106 to perform a read, a write, or an erase on the FM 0102. The internal network 0107 may include a switch. Further, the internal network 0107 may be substituted by an application-specific integrated circuit (ASIC) having a switching function.

In the present embodiment, the SSD 0100 is a storage medium that includes one or more than one FM and a controller controlling the FM. For example, the appearance form of the SSD 0100 is not limited to a specific form factor.

Figure 2:
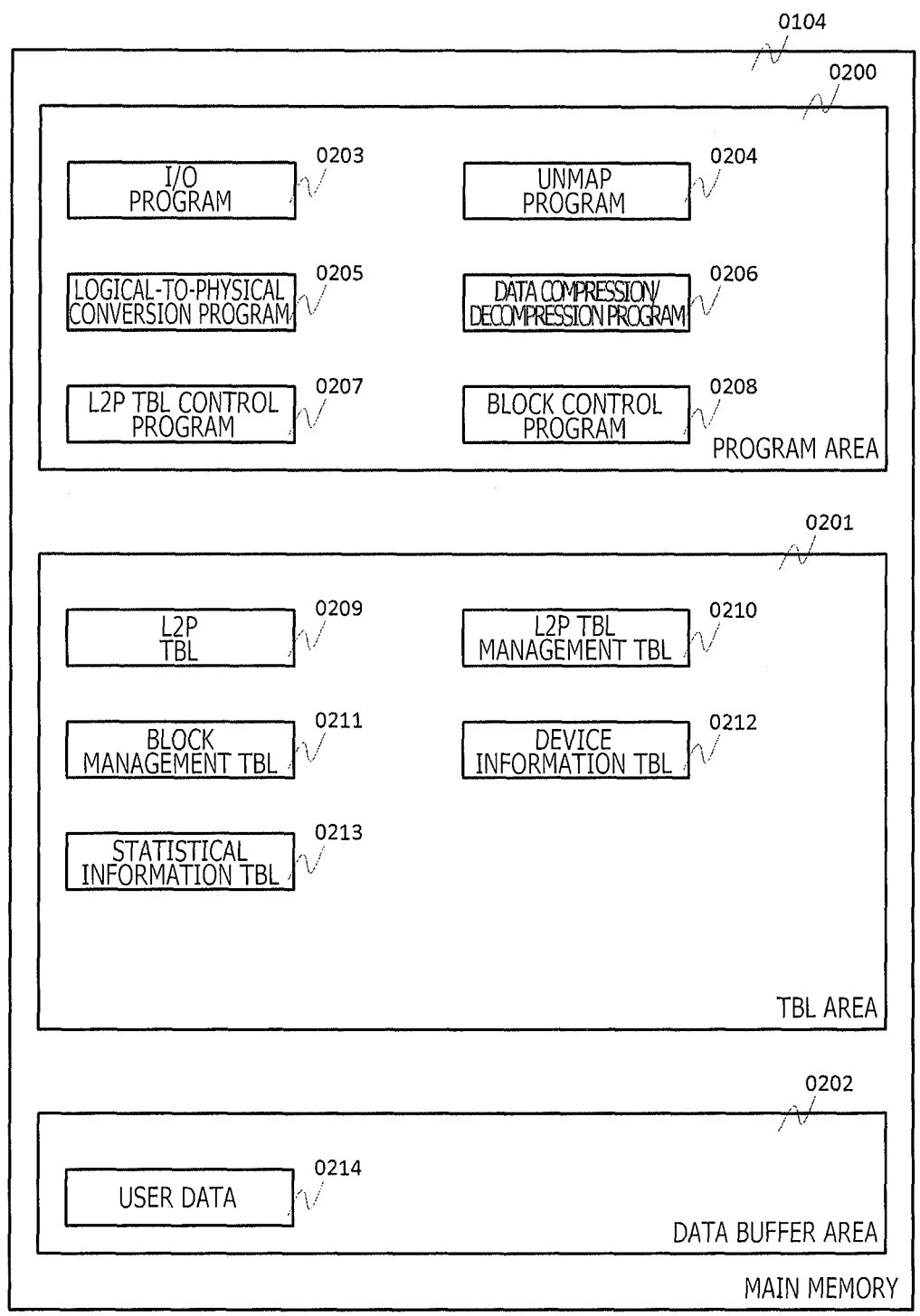
FIG. 2 is a diagram illustrating an exemplary configuration of a main memory 0104.

FIG. 2 is a diagram illustrating an exemplary configuration of the main memory 0104.

The main memory 0104 includes a program area 0200, a TBL area 0201, and a data buffer area 0202. The program area 0200 and the TBL area 0201 store programs and tables for controlling the SSD 0100. The data buffer area 0202 temporarily stores user data 0214 that is transmitted and received to and from the higher-level device 0108.

The program area 0200 stores an I/O program 0203, an unmap program 0204, a logical-to-physical conversion program 0205, a data compression/decompression program 0206, an L2P (logical to physical conversion) TBL (table) control program 0207, and a block control program 0208.

The I/O program 0203 processes a read or write request from the higher-level device 0108. The unmap program 0204 processes an unmap request (a request for invalidating certain data) from the higher-level device 0108. The logical-to-physical conversion program 0205 performs logical-to-physical conversion. The data compression/decompression program 0206 compresses or decompresses user data while the I/O program 0203 is executed. The L2P TBL control program 0207 provides control over a storage place (the main memory 0104 or the FM 0102) where an L2P TBL 0209, which is meta data, is stored. The block control program 0208 controls FM resources by managing, for example, a write destination block, the number of unoccupied blocks, an RCM amount, and the number of blocks to be allocated to user data and meta data.

The L2P TBL 0209 contains information about mapping of logical addresses and physical addresses. An L2P TBL management TBL 0210 contains information for managing whether the L2P TBL 0209 is stored in the main memory 0104 or in the FM 0102. A block management TBL 0211 contains information about block status. A device information TBL 0212 contains information about device resources. A statistical information TBL 0213 contains a history of device status at a specific point of time.

Logical-physical management information will now be described.

The SSD 0100 provides the higher-level device 0108 with a logical address space larger than a physical address space by compressing write data and storing it in the FM 0102. Thus, the size of the logical-physical management information becomes too large to be completely stored in the main memory 0104.

In order to manage the above-described logical-physical management information, the SSD 0100 reads, as needed, the logical-physical management information from the FM 0102 into the main memory 0104 and writes, as needed, the logical-physical management information back into the FM 0102 (hierarchical logical-physical method). An SSD having no compression function is capable of storing the whole logical-physical management information in a main memory. Therefore, when the logical-physical management information is accessed for a read/write process, no read/write operation is performed on the FM. Meanwhile, if relevant logical-physical management information is not found in the main memory (in the event of a logical-physical failure) when logical-to-physical conversion and logical-physical management information is to be updated in a situation where the hierarchical logical-physical method is employed, it is necessary to save (write) the logical-physical management information from the main memory into the FM and then acquire (read) necessary logical-physical management information from the FM into the main memory. Consequently, if a logical-physical failure frequently occurs, the logical-physical management information, which is meta data, is frequently read from and written into the FM.

In general, the size of logical page, which is the management unit of user data (the unit of logical-to-physical conversion), is several kilobytes. Meanwhile, the size of the logical-physical management information is several bytes per logical page and can be regarded as relatively small. Thus, it is conceivable that the amount of meta data write subsequent to a logical-physical failure is smaller than the amount of user data write. However, the hierarchical logical-physical method needs to manage whether the meta data exists in the main memory or in the FM, and the FM needs to be read and written in the unit of a page. Therefore, the meta data is managed in the unit of a plurality of logical pages (e.g., the same several kilobytes as the logical page size). Consequently, for a single logical-physical failure, several kilobytes of meta data needs to be written. Further, when the SSD has the compression function, the user data is compressed before being written into the FM. Therefore, the higher the compression ratio for the user data (the smaller the size of compressed data as compared with the size of uncompressed data), the larger the amount of user data storable in the SSD and thus the greater the number of logical pages to be managed. This increases the amount of meta data and decreases the percentage of meta data storable in the main memory. That is to say, the higher the data compression ratio, the smaller the amount of user data write into the FM and the higher the probability of logical-physical failure occurrence. Therefore, the amount of meta data write accounts for a high percentage of the total amount of write into the FM.

Further, as is the case with a user data write, a meta data write into the FM also consumes unoccupied blocks. However, when control is exercised to maintain the number of unoccupied blocks as needed for RCM in a conventional SSD and other I/O continuation (hereinafter referred to as block control), such a meta data write is not taken into consideration. Therefore, the depletion of unoccupied blocks may occur in an SSD having the data compression function.

When, for example, unoccupied blocks are to be efficiently generated for RCM, the amount of valid-data movement is decreased. That is to say, blocks having a low percentage of valid data (a high percentage of invalid data) are selected as a target for RCM, and then valid data in the selected blocks are moved. However, if user data is stored in the blocks selected as a target for RCM, the logical-physical management information needs to be referenced and updated for moving the user data. Therefore, a logical-physical failure occurs at the time of RCM, and a meta data write into the FM subsequent to the occurrence of the logical-physical failure also consumes the unoccupied blocks. Further, even if the amount of RCM is increased to achieve recovery from the consumption of the unoccupied blocks, unoccupied blocks are further consumed for the same reason because conventional block control is not capable of distinguishing between user data and meta data. Consequently, a chain reaction may occur so that the speed of generation of unoccupied blocks due to RCM becomes lower than the speed of consumption of unoccupied blocks. As a result, unoccupied blocks may be depleted in some cases.

A method of managing the logical-physical management information to prevent the above-described depletion of unoccupied blocks will now be described.

Figure 3:
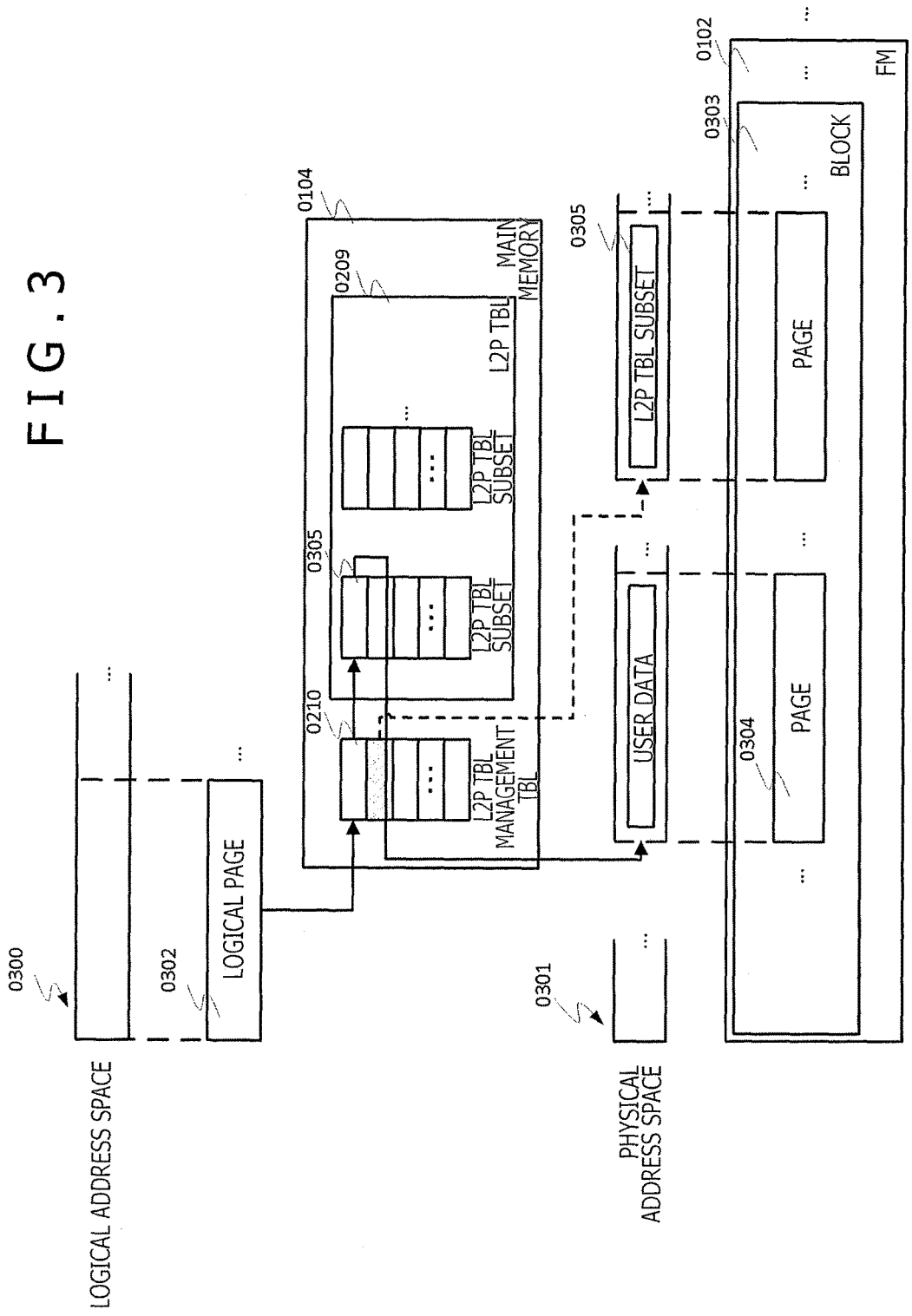
FIG. 3 is a diagram illustrating the correspondence between a logical address space 0300 and a physical address space 0301.

FIG. 3 is a diagram illustrating the correspondence between a logical address space 0300 and a physical address space 0301.

The logical address space 0300, which is provided for the higher-level device 0108, corresponds to one or more logical pages 0302. The physical address space 0301, which is associated with the FM 0102, corresponds to one or more pages 0304. The FM 0102 has one or more blocks 0303. Each block 0303 is the unit of data erasure in the FM 0102, and has one or more pages 0304. Each page 0304 is the unit of data read/write in the FM 0102.

The logical address space 0300 and the physical address space 0301 are mapped by the L2P TBL 0209. The L2P TBL 0209 has one or more L2P TBL subsets 0305. The L2P TBL management TBL 0210 is stored in the main memory 0104, and has information indicating whether each L2P TBL subset 0305 (meta data) is stored in the main memory 0104 or in the FM 0102 and at what address within the main memory 0104 or the FM 0102.

The CPU 0106 manages the L2P TBL of the whole logical address space by dividing it into the L2P TBL subsets 0305 having a predetermined number of entries. The data size of each L2P TBL subset 0305 is, for example, is not larger than the page size, which is the access unit of the FM 0102. The mapping between the logical addresses and physical addresses of all user data is expressed by a plurality of L2P TBL subsets 0305. The CPU 0106 stores some of the L2P TBL subsets 0305 in the main memory 0104 and stores the remaining L2P TBL subsets 0305 in the FM 0102. The CPU 0106 may alternatively store all the L2P TBL subsets 0305 in the FM 0102 and store some of L2P TBL subsets 0305 in the main memory 0104.

When the above-described management method is used, the L2P TBL that cannot be completely stored in the main memory 0104 can be stored in the FM 0102. Further, a part of the L2P TBL can be stored in the main memory 0104 in order to achieve high-speed logical-to-physical conversion.

FIG. 4 is a diagram illustrating an exemplary configuration of the L2P TBL 0209.

The L2P TBL 0209 has an entry for each logical page. Each entry includes a logical page # (number) 0400, a status 0401, a physical address 0402, a size 0403, and subset # 0404. The logical page # 0400 is an identifier of a logical page and unique. The status 0401 indicates whether the logical page is associated with a physical address (valid or unallocated). The physical address 0402 indicates the physical address of the beginning of an area associated with the logical page in the FM 0102. The size 0403 indicates the data size of compressed data on the logical page. The subset # 0404 indicates an identifier of an L2P TBL subset 0305 to which the logical page belongs. The physical address 0402 and the size 0403 may be substituted, for example, by a physical page number and the number of physical pages.

Further, in the order of logical page numbers, the L2P TBL 0209 is divided into the L2P TBL subsets 0305, which are each provided for a predetermined number of entries.

FIG. 5 is a diagram illustrating an exemplary configuration of the L2P TBL management TBL 0210.

The L2P TBL management TBL 0210 has an entry for each L2P TBL subset 0305. Each entry includes an L2P TBL subset # 0500, a status 0501, a storage place 0502, and a subset address 0503. The L2P TBL subset # 0500 is an identifier of an L2P TBL subset and unique. The status 0501 indicates whether the L2P TBL subset is associated with the L2P TBL 0209 (valid or unallocated). The storage place 0502 indicates whether the L2P TBL subset is stored in the main memory 0104 or in the FM 0102. The storage place 0502 may alternatively indicate whether or not the L2P TBL subset is stored in the main memory 0104. The subset address 0503 indicates a physical address of the FM 0102 at which the L2P TBL subset is stored or a main memory address of the main memory 0104 at which the L2P TBL subset is stored. If the L2P TBL subset is stored in both the FM 0102 and the main memory 0104, the subset address 0503 may indicate both addresses.

Figure 6:
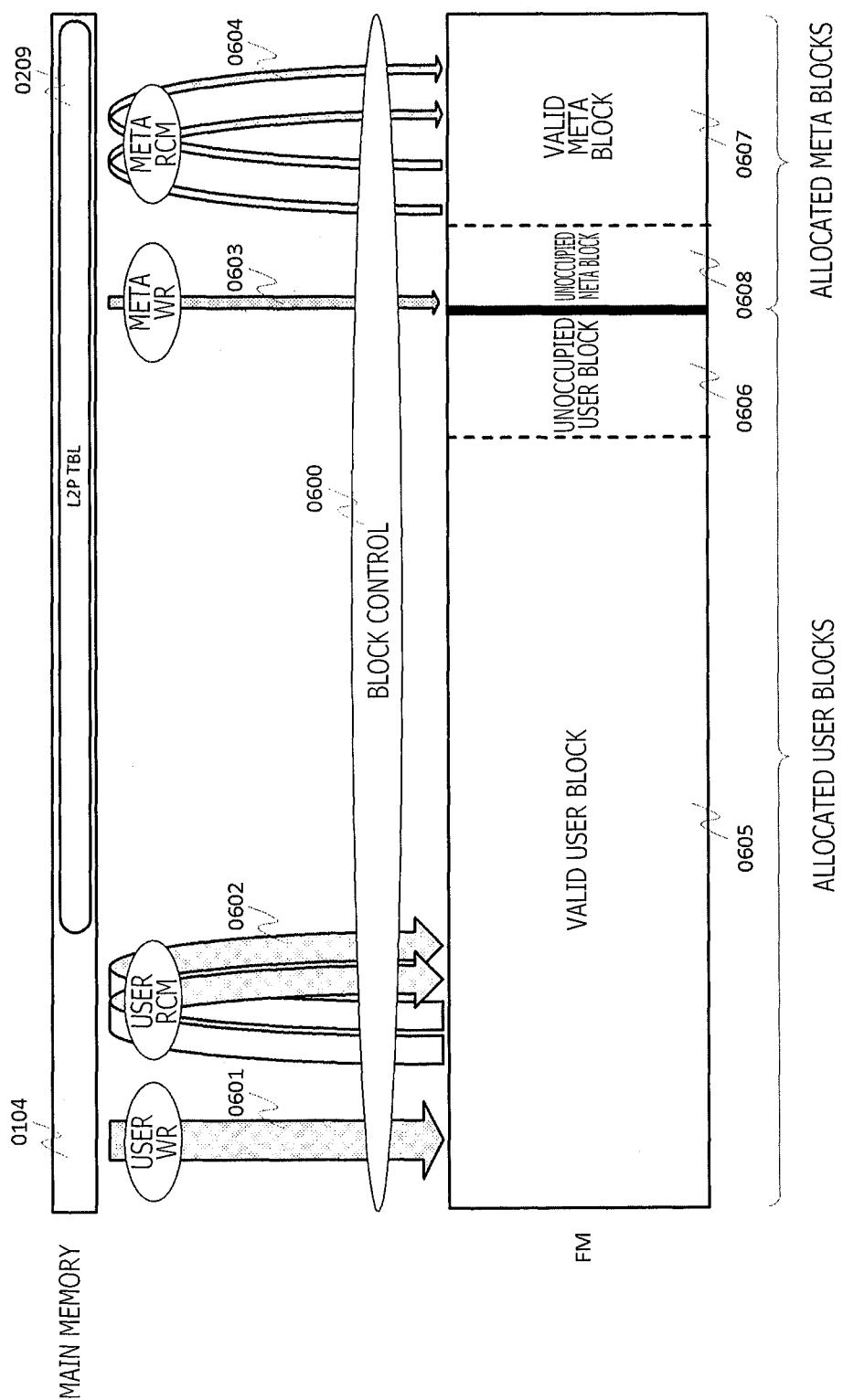
FIG. 6 illustrates an overview of block control 0600 in a first state.
Figure 7:
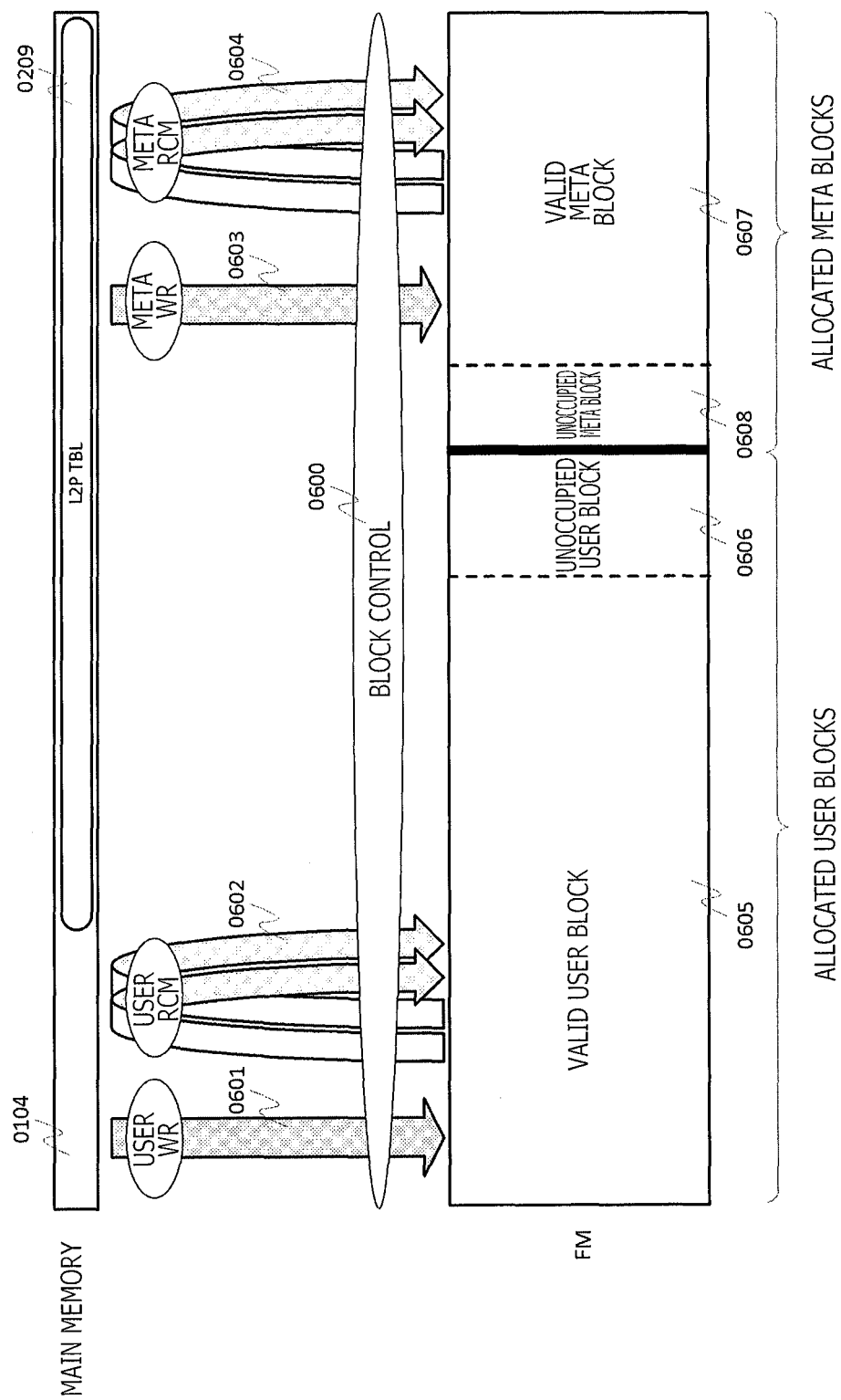
FIG. 7 illustrates an overview of block control 0600 in a second state.

FIG. 6 illustrates an overview of block control 0600 in a first state. FIG. 7 illustrates an overview of block control 0600 in a second state.

As a write into the FM 0102, a user data write (user WR) 0601, a user data RCM (user RCM) 0602, a meta data write (meta WR) 0603, and a meta data RCM (meta RCM) 0604 are performed. The user data write (user WR) 0601 is writing user data from the higher-level device 0108 into the FM 0102. The user data RCM (user RCM) 0602 moves user data stored in the FM 0102 to achieve RCM. The meta data write (meta WR) 0603 writes into the FM 0102 meta data indicative of user data on which a user WR 0601 is performed. The meta data RCM (meta RCM) 0604 moves meta data stored in the FM 0102 to achieve RCM. The amount of data written into the FM 0102 by user WR, meta WR, user RCM, and meta RCM is referred to as the total FM write amount.

Block control 0600 manages the number of blocks generated and consumed by user WR 0601, user RCM 0602, meta WR 0603, and meta RCM 0604, and adjusts the RCM amount. Further, block control 0600 manages the FM 0102 in the unit of a block 0303 by dividing the FM 0102 into four groups, namely, valid user blocks 0605, unoccupied user blocks 0606, valid meta blocks 0607, and unoccupied meta blocks 0608. The valid user blocks 0605 are allocated for user data and used to store valid user data. The unoccupied user blocks 0606 are unoccupied blocks allocated for user data. The valid meta blocks 0607 are allocated for meta data and used to store valid meta data. The unoccupied meta blocks 0608 are unoccupied blocks allocated for meta data. The valid user blocks 0605 and the unoccupied user blocks 0606 are collectively referred to as the allocated user blocks, and the valid meta blocks 0607 and the unoccupied meta blocks 0608 are collectively referred to as the allocated meta blocks. Additionally, block control 0600 controls the number of allocated user blocks and the number of allocated meta blocks.

How the number of allocated meta blocks is dynamically changed will now be described with reference to FIGS. 6 and 7. The first state is a state where meta WR 0603 and meta RCM 0604 are smaller in amount than user WR 0601 and user RCM 0602. When a large amount of data is uncompressed, the logical address space is small relative to the user data size, the amount of meta data is small, and a small amount of meta data moves between the main memory 0104 and the FM 0102. Further, when an I/O pattern is for local address accessing, a small amount of meta data moves between the main memory 0104 and the FM 0102. In such an instance, block control 0600 decreases the number of allocated meta blocks. This lowers the valid data percentage in each valid user block 0605, decreases the amount of user RCM 0602, and decreases the total FM write amount. The valid data percentage is the ratio of the number of valid pages to the number of pages in a block. The total FM write amount is the total amount of write into the FM 0102 that is performed by user WR 0601, user RCM 0602, meta WR 0603, and meta RCM 0604.

Meanwhile, the second state is a state where the amounts of meta WR 0603 and meta RCM 0604 are increased as compared to the first state. When a large amount of data is compressed, the logical address space is large relative to the user data size, the amount of meta data is large, and a large amount of meta data moves between the main memory 0104 and the FM 0102. Further, when the I/O pattern is for wide address accessing, a large amount of meta data moves between the main memory 0104 and the FM 0102. In such an instance, block control 0600 increases the number of allocated meta blocks. This lowers the valid data percentage in each valid meta block 0607, decreases the amount of meta RCM 0604, and decreases the total FM write amount.

FIG. 8 is a diagram illustrating an exemplary configuration of the block management TBL 0211.

The block management TBL 0211 has an entry for each block. Each entry includes a block # 0700, a status 0701, a data type 0702, a valid data percentage 0703, and FM life information 0704. The block # 0700 is an identifier of a block and unique. The status 0701 indicates the status of the block, namely, "valid (closed)," "valid (open)," or "unoccupied." The "valid (closed)" state is a state where all pages in the block are written. The "valid (open)" state is a state where some pages in the block are written. The "unoccupied" state is a state where the block is erased. The valid data percentage 0703 indicates the ratio of the number of valid pages to the number of pages in the block. The FM life information 0704 is the information about life, such as the number of erasures of the block. The status 0701 may indicate an "invalid" state where all pages in the block are invalid and the block is unerased. Further, the valid data percentage 0703 may be substituted, for example, by the number of valid pages, the number of invalid pages, or the invalid data percentage, which is the ratio of the number of invalid pages to the number of pages in the block.

FIG. 9 is a diagram illustrating an exemplary configuration of the device information TBL 0212.

The device information TBL 0212 includes a maximum logical capacity 0800, a total FM capacity 0801, a main memory meta capacity 0802, a valid logical data size 0803, a user data size 0804, a meta data size 0805, a valid user block count 0806, an unoccupied user block count 0807, a valid meta block count 0808, and an unoccupied meta block count 0809.

The maximum logical capacity 0800 is a preset capacity indicative of the maximum amount of user data storable in the SSD 0100 having the data compression function. The total FM capacity 0801 is a preset value indicative of the capacity of the FM 0102 included in the SSD 0100. That is to say, the SSD 0100 is capable of providing the higher-level device 0108 with the maximum logical capacity 0800 larger than the total FM capacity 0801. The main memory meta capacity 0802 is a preset value indicative of the capacity of the main memory 0104 included in the SSD 0100 that is available for storing meta data. The valid logical data size 0803 indicates the size of uncompressed user data stored in the SSD 0100. The user data size 0804 indicates the physical size of compressed user data stored in the FM 0102. The meta data size 0805 indicates the physical size of meta data stored in the main memory 0104 and the FM0102. The valid user block count 0806 indicates the total number of allocated user blocks that are allocated for user data to store valid data. The unoccupied user block count 0807 indicates the total number of unoccupied allocated user blocks and corresponds to the unoccupied user blocks 0606. The valid meta block count 0808 indicates the total number of allocated meta blocks that are allocated for meta data and used to store valid data. The unoccupied meta block count 0809 indicates the total number of unoccupied allocated meta blocks and corresponds to the unoccupied meta blocks 0608.

When the valid logical data size 0803 increases, the meta data size 0805 also increases.

FIG. 10 is a diagram illustrating an exemplary configuration of the statistical information TBL 0213.

The statistical information TBL 0213 has an entry for each generation. Each entry includes a generation # 0900, an update date and time 0901, a user data size 0902, a meta data size 0903, an FM write ratio 0904, and a user write tendency 0905.

The generation # 0900 is an identifier indicative of a time point and unique. The update date and time 0901 indicates the date and time when the information about the entry is updated. The user data size 0902 indicates the physical size of compressed user data that is stored in the FM 0102 when the entry is updated, and corresponds to the user data size 0804 included in the device information TBL 0212. The meta data size 0903 indicates the physical size of meta data that is stored in the main memory 0104 and the FM 0102 when the entry is updated, and corresponds to the meta data size 0805 included in the device information TBL 0212. The FM write ratio 0904 indicates the ratio between the amount of user data write into the FM 0102 and the amount of meta data write into the FM 0102 during a period between the last entry update and the current entry update. The user write tendency 0905 is information about the tendency of user write between the last statistical information update and the current entry update and indicative, for example, of an I/O length and an access pattern (sequential or random).

The CPU 0106 may prepare an entry in the statistical information TBL 0213 on a periodic basis, each time a write is performed, or each time the L2P TBL 0209 is referenced.

Operations of the SSD 0100 will now be described.

Figure 11:
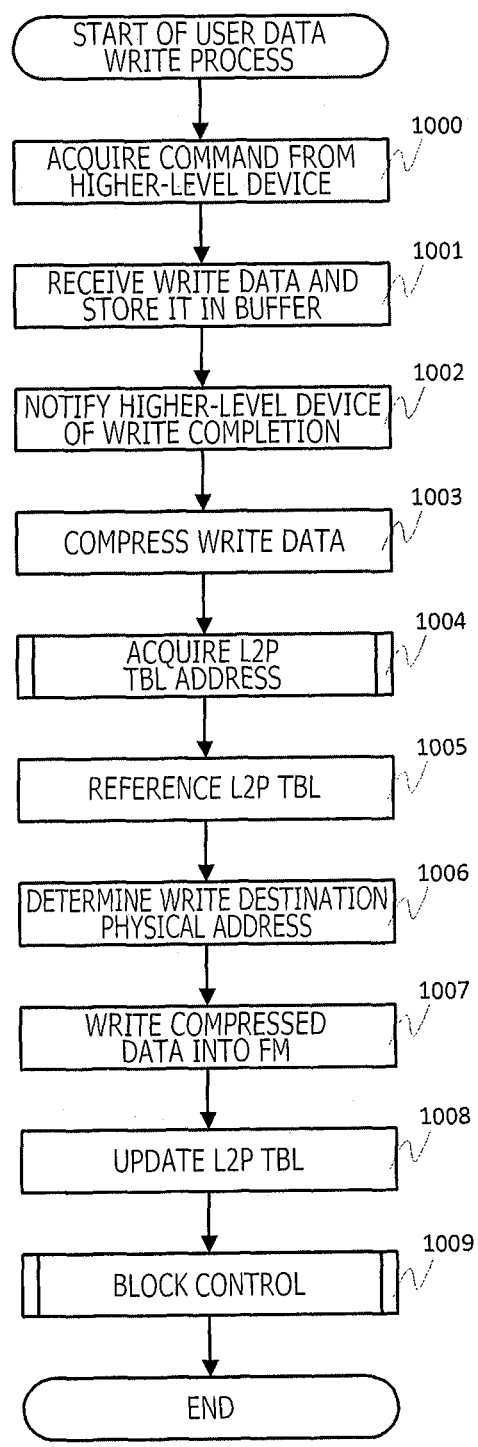
FIG. 11 is a flowchart illustrating an example of a user data write process.

FIG. 11 is a flowchart illustrating an example of a user data write process.

The user data write process is initiated upon receipt of a write command issued from the higher-level device 0108 and continued until the write command is completed.

The CPU 0106 acquires the write command from the higher-level device 0108 (step 1000).

After analyzing the write command, the CPU 0106 requests the higher-level device 0108 to transmit write data, and stores the write data received from the higher-level device 0108 in the data buffer area 0202 (step 1001).

The CPU 0106 transmits a write completion response to the higher-level device 0108 (step 1002).

The CPU 0106 compresses the write data stored in the data buffer area 0202 (step 1003).

The CPU 0106 performs an L2P TBL address acquisition process to acquire a subset's main memory address corresponding to a logical address of the L2P TBL 0209 that is indicated by the write command (step 1004). This process will be described in detail later.

Based on the subset's main memory address acquired in step 1004 and the logical page # calculated from the write command, the CPU 0106 acquires an entry of the relevant logical page that is included in the subset (step 1005).

Based on the information in the block management TBL 0211, the CPU 0106 determines a write destination physical address (step 1006). The write destination physical address is determined by using the status 0701 and life information 0704 in the block management TBL 0211. As the write destination physical address, the CPU 0106 selects, for example, a block having a long remaining life or a page subsequent to an open block.

The CPU 0106 issues to the FM 0102 a write request for writing compressed data at the write destination physical address determined in step 1006, and waits for the completion of the write (step 1007).

After the write request issued instep 1007 is completed, the CPU 0106 updates the physical address 0402 of the relevant entry in the L2P TBL 0209 (step 1008).

The CPU 0106 calls a block control process, exercises, for example, RCM control and block count control for controlling the number of blocks to be allocated to meta data, and then terminates the block control process (step 1009). This process will be described in detail later.

According to the above-described write process, the CPU 0106 is able to register the write destination physical address in a subset within the main memory 0104 that is associated with a logical address designated by the write command.

Figure 12:
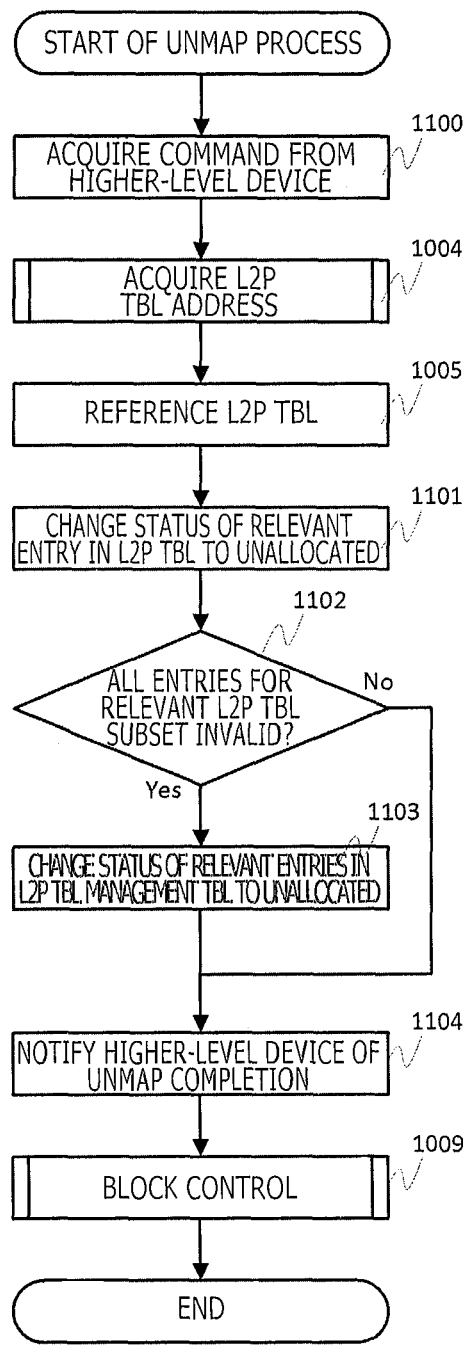
FIG. 12 is a flowchart illustrating an example of an unmap process.

FIG. 12 is a flowchart illustrating an example of an unmap process.

The unmap process is initiated upon receipt of an unmap command issued from the higher-level device 0108 and continued until the unmap command is completed.

The CPU 0106 acquires the unmap command from the higher-level device 0108 (step 1100). The unmap command is, for example, a trim command. The unmap command indicates that the higher-level device 0108 no longer uses data within a designated logical address range. Thus, the unmap command permits the CPU 0106 to invalidate the designated logical address range.

The CPU 0106 performs the L2P TBL address acquisition process to acquire a subset's main memory address in the L2P TBL 0209 that corresponds to the unmap command (step 1004). This process will be described in detail later.

Based on the subset's main memory address acquired in step 1004 and the logical page # calculated from the unmap command, the CPU 0106 acquires an entry of the relevant logical page that is included in the subset (step 1005).

The CPU 0106 changes the status 0401 of the relevant entry of the relevant subset to "unallocated" (step 1101).

The CPU 0106 determines whether all entries of the relevant subset are invalid (step 1102). If the result of determination indicates that all the entries are invalid ("YES" at step 1102), the CPU 0106 proceeds to step 1103 (A). If, by contrast, all the entries are not invalid ("NO" at step 1102), the CPU 0106 proceeds to step 1104 (B).

(A)

The CPU 0106 references the L2P TBL management TBL 0210 and changes the status 0501 of the entries of the relevant subset to "unallocated" (step 1103). This increases the invalid data percentage of allocated meta blocks. Subsequently, the CPU 0106 proceeds to step 1104 (B).

(B)

The CPU 0106 transmits an unmap completion response to the higher-level device 0108 (step 1104).

The CPU 0106 calls the block control process, exercises, for example, RCM control and block count control for controlling the number of blocks to be allocated to meta data, and then terminates the block control process (step 1009). This process will be described in detail later.

According to the above-described unmap process, the CPU 0106 is able to remove the mapping of physical addresses in a subset within the main memory 0104 that is associated with logical addresses designated by the unmap command.

Figure 13:
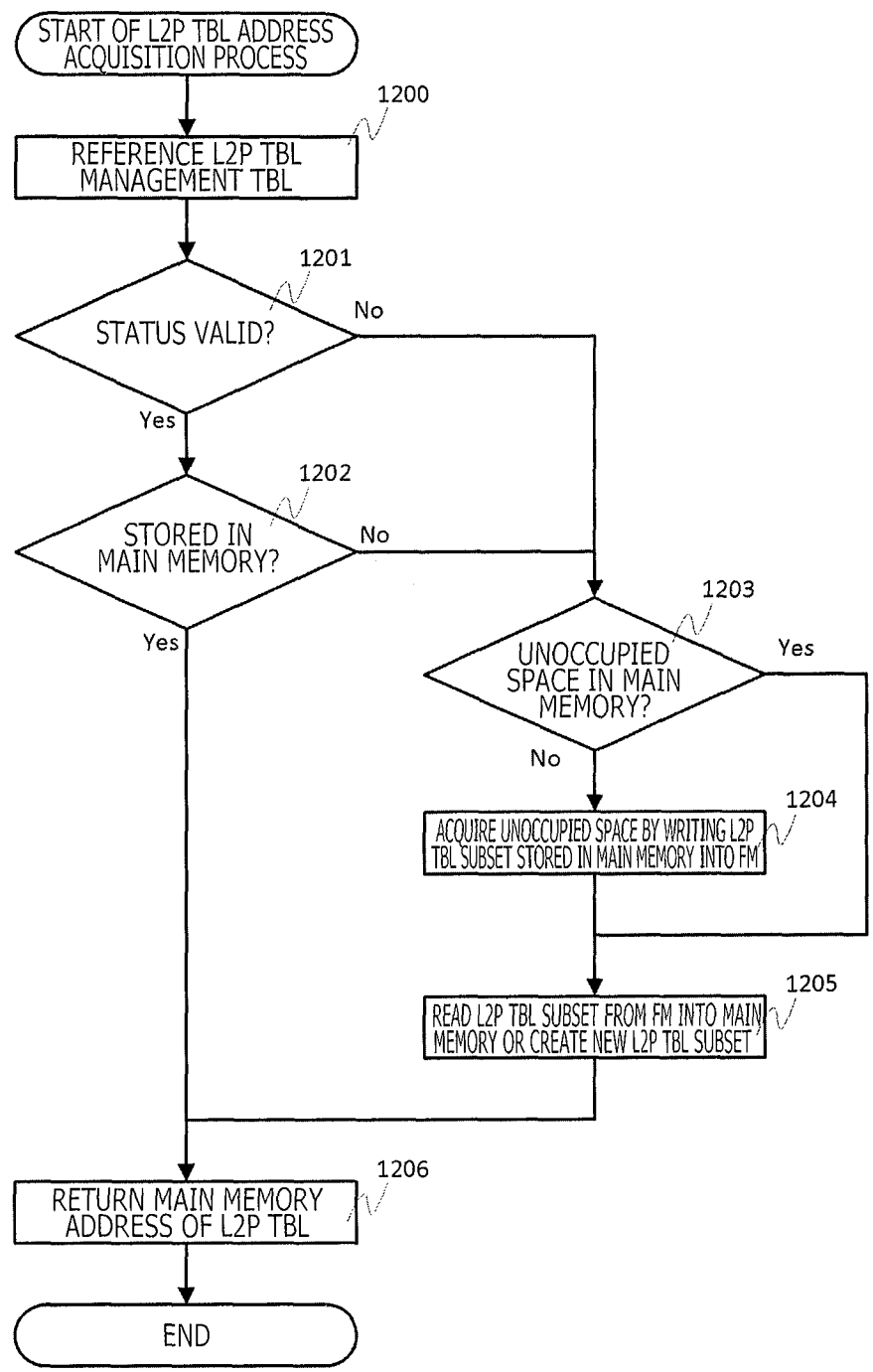
FIG. 13 is a flowchart illustrating an example of an L2P TBL address acquisition process.

FIG. 13 is a flowchart illustrating an example of the L2P TBL address acquisition process.

In step 1004 of the above-described user data write process and unmap process, the CPU 0106 performs the L2P TBL address acquisition process.

The CPU 0106 references the L2P TBL management TBL 0210, and acquires an entry in the L2P TBL subset 0305 that is associated with a logical page designated by the command (step 1200).

Based on the information acquired in step 1200, the CPU 0106 determines whether the status 0501 of the relevant L2P TBL subset 0305 is valid (step 1201). If the result of determination indicates that the status 0501 is valid ("YES" at step 1201), the CPU 0106 proceeds to step 1202 (D). If, by contrast, the status 0501 is not valid ("NO" at step 1201), the CPU 0106 proceeds to step 1203 (E).

(D)

Based on the information acquired in step 1200, the CPU 0106 determines whether the main memory is the storage place 0502 for the relevant L2P TBL subset 0305 (step 1202). If the result of determination indicates that the main memory is the storage place 0502 ("YES" at step 1202), the CPU 0106 proceeds to step 1206 (H). If, by contrast, the main memory is not the storage place 0502 ("NO" at step 1202), the CPU 0106 proceeds to step 1203 (E).

(E)

The CPU 0106 determines whether the main memory 0104 has an unoccupied area adequate for newly storing the L2P TBL subset 0305 (step 1203). If the result of determination indicates that the main memory 0104 does not have such an unoccupied area ("NO" at step 1203), the CPU 0106 proceeds to step 1204 (F). If, by contrast, the main memory 0104 has such an unoccupied area ("YES" at step 1203), the CPU 0106 proceeds to step 1205 (G).

(F)

The CPU 0106 acquires an unoccupied space by selecting an L2P TBL subset 0305 stored in the main memory 0104, writing the selected L2P TBL subset 0305 into the FM 0102, changing the storage place 0502 for the relevant entry in the L2P TBL management TBL 0210 to "FM," and changing the physical address/main memory address 0503 to the physical address of the storage destination (step 1204). The L2P TBL subset 0305 to be written into the FM 0501 may be determined based on managed information such as the information about reference and update frequencies. Upon completion of step 1204, the CPU 0106 proceeds to step 1205 (G). If the L2P TBL subset 0305 stored in the main memory 0104 is stored in the FM 0102 as well and the L2P TBL subset 0305 stored in the main memory 0104 is not updated, it is not necessary for the CPU 0106 to perform step 1204.

If the result obtained in step 1201 is "YES," the CPU 0106 reads the relevant L2P TBL subset from the FM 0102 into the main memory 0104, changes the storage place 0502 for the relevant L2P TBL subset in the L2P TBL management TBL 0210 to the main memory, and changes the subset address 0503 to the main memory address of the storage destination (step 1205). If, by contrast, the result obtained instep 1201 is "NO," the CPU 0106 creates a new L2P TBL subset 0305 in the main memory 0104, changes the status 0501 of the relevant entry in the L2P TBL management TBL 0210 to valid, changes the storage place 0502 to the main memory, and changes the subset address 0503 to the main memory address of the storage destination (step 1205). Subsequently, the CPU 0106 proceeds to step 1206 (H).

(H)

The CPU 0106 returns the subset address 0503 of the relevant entry in the L2P TBL management TBL 0210, and then terminates the process (step 1206).

According to the above-described L2P TBL address acquisition process, the CPU 0106 is able to acquire the position within the main memory 0104 where a subset associated with a designated logical address exists. Further, if the subset is not stored in the main memory 0104, the CPU 0106 is able to read the subset from the FM 0102 into the main memory 0104.

Figure 14:
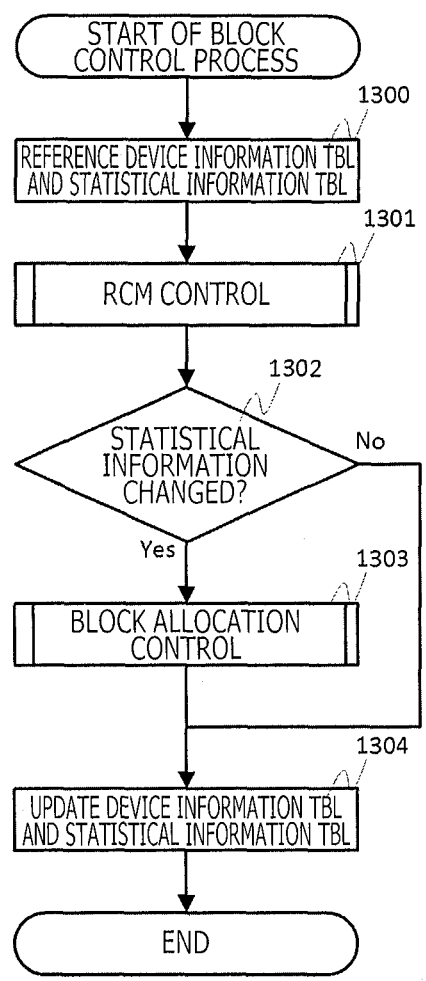
FIG. 14 is a flowchart illustrating an example of a block control process.

FIG. 14 is a flowchart illustrating an example of the block control process.

In step 1009 of the above-described user data write process and unmap process, the CPU 0106 performs the block control process.

The CPU 0106 acquires various information from at least one of the device information TBL 0212 and statistical information TBL 0213 (step 1300).

The CPU 0106 performs an RCM control process to calculate the RCM amounts required for user data and meta data, respectively, based on the various information acquired in step 1300, and execute RCM (step 1301). This process will be described in detail later.

The CPU 0106 checks a latest generation entry in the statistical information TBL 0213, which is acquired in step 1300, to determine whether any change is applied to an earlier generation entry (step 1302). For example, the CPU 0106 pays attention to a specific field of the statistical information TBL 0213 and calculates the ratio between a latest generation entry and an immediately preceding generation entry. If the calculated ratio is outside a preset range, the CPU 0106 determines that a change is applied. The specific field is, for example, the meta data size 0903. The specific field may be at least one of the user data size 0902, meta data size 0903, FM write ratio 0904, and user write tendency 0905. If the result of determination indicates that a change is applied ("YES" at step 1302), the CPU 0106 proceeds to step 1303 (J). If, by contrast, no change is applied ("NO" at step 1302), the CPU 0106 proceeds to step 1304 (K).

(J)

The CPU 0106 performs a block allocation control process to calculate, based on the information acquired in step 1300, the number of allocated user blocks and the number of allocated meta blocks that minimize the total FM write amount, and increase or decrease the numbers of such blocks (step 1303). This process will be described in detail later. Subsequently, the CPU 0106 proceeds to step 1304 (K).

(K)

The CPU 0106 updates various information in the device information TBL 0212 and the statistical information TBL 0213, and then terminates the process (step 1304). The CPU 0106 may update the statistical information TBL 0213 in each execution of step 1304 or after an elapse of a preset period of time since the last update.

According to the above-described block control process, the CPU 0106 is able to change the number of allocated user blocks and the number of allocated meta blocks when it is determined that statistical information is changed. If it is determined that the statistical information is not changed, the CPU 0106 is able to determine that the current number of allocated user blocks and the current number of allocated meta blocks are optimal, and maintain the current number of allocated user blocks and the current number of allocated meta blocks.

Figure 15:
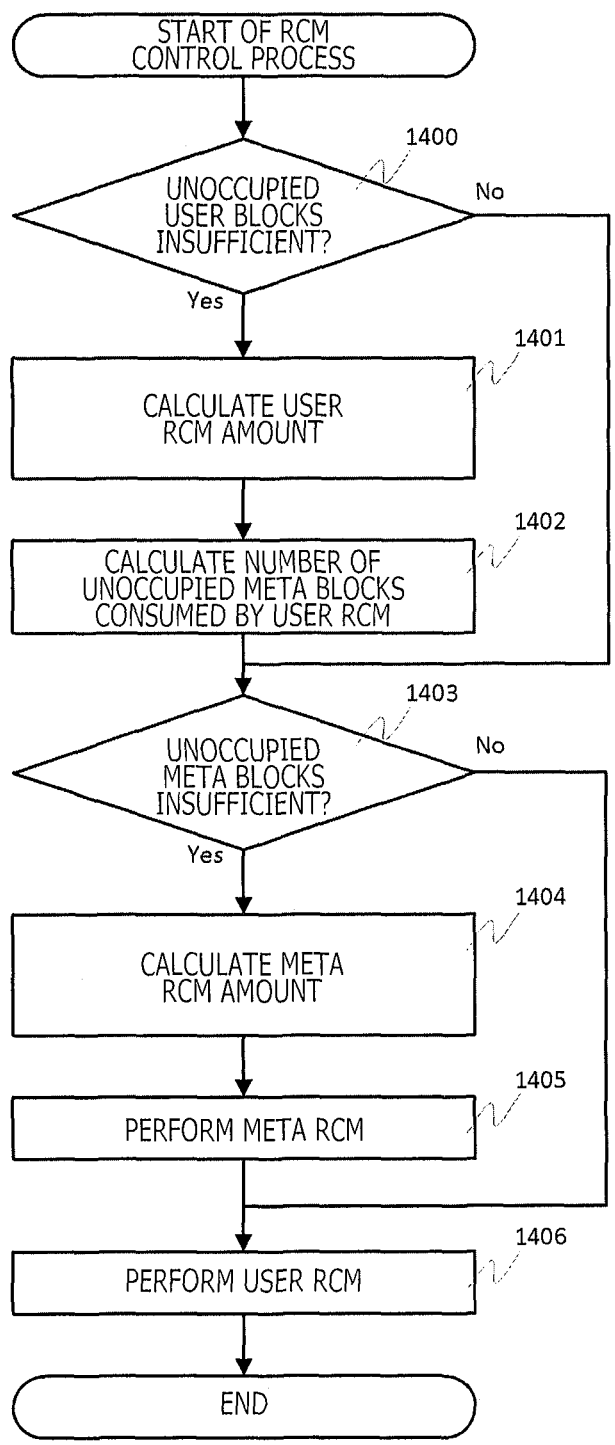
FIG. 15 is a flowchart illustrating an example of an RCM control process.

FIG. 15 is a flowchart illustrating an example of the RCM control process.

In step 1301 of the above-described block control process, the CPU 0106 performs the RCM control process.

Based on the information acquired in step 1300, the CPU 0106 determines whether unoccupied user blocks are insufficient (step 1400). If, for example, the number of unoccupied user blocks is smaller than an unoccupied user block count threshold value, the CPU 0106 determines that the unoccupied user blocks are insufficient. The unoccupied user block count threshold value may be preset or calculated by multiplying the number of allocated user blocks by a preset unoccupied user block ratio. If the number of blocks to be used for the RCM control process is given, whether the unoccupied user blocks are insufficient is determined by newly calculating the number of unoccupied user blocks by subtracting the number of blocks to be used from the number of unoccupied user blocks. If the result of determination indicates that the unoccupied user blocks are insufficient ("YES" at step 1400), the CPU 0106 proceeds to step 1401 (M). If, by contrast, the unoccupied user blocks are not insufficient ("NO" at step 1400), the CPU 0106 proceeds to step 1403 (N).

(M)

Based on the information acquired in step 1300 and on the block management TBL 0211, the CPU 0106 calculates a user RCM amount required for acquiring sufficient unoccupied user blocks (the amount of user data to be moved (rewritten) in order to acquire unoccupied user blocks) (step 1401). For example, the CPU 0106 calculates the number of insufficient unoccupied user blocks relative to the unoccupied user block count threshold value, and calculates, as the user RCM amount, the number of valid pages to be moved from the number of insufficient blocks and the percentage of valid data in valid user blocks.

Based on the user RCM amount calculated in step 1401, the CPU 0106 calculates the number of unoccupied meta blocks to be consumed by the RCM (the number of unoccupied meta blocks to be consumed) (step 1402). For example, the CPU 0106 determines the total size of L2P TBL subsets 0305 that are associated with valid pages included in a user RCM target block and stored in the FM 0102, and calculates, as the number of unoccupied meta blocks to be consumed, the number of unoccupied meta blocks required for writing meta data having the same size as the determined total size into the FM 0102. Alternatively, the CPU 0106 may calculate a logical-physical failure rate and statistically calculate, based on the calculated logical-physical failure rate, the number of unoccupied meta blocks to be consumed. Upon completion of step 1402, processing proceeds to step 1403 (N).

(N)

When step 1402 is performed based on the information acquired in step 1300, the CPU 0106 considers a meta RCM consumption block count calculated in step 1402 and determines whether unoccupied meta blocks are insufficient (step 1403). For example, the CPU 0106 calculates a predicted unoccupied meta block count by subtracting the meta RCM consumption block count from the number of unoccupied meta blocks. If the predicted unoccupied meta block count is smaller than an unoccupied meta block count threshold value, the CPU 0106 determines that the unoccupied meta blocks are insufficient. The unoccupied meta block count threshold value may be preset or calculated by multiplying the number of allocated meta blocks by a preset unoccupied meta block ratio. If the result of determination indicates that the unoccupied meta blocks are insufficient ("YES" at step 1403), the CPU 0106 proceeds to step 1404 (O). If, by contrast, the unoccupied meta blocks are not insufficient ("NO" at step 1403), the CPU 0106 proceeds to step 1406 (P).

(O)

Based on the information acquired in step 1300 and on the block management TBL 0211, the CPU 0106 calculates a meta RCM amount required for the acquisition of sufficient unoccupied blocks (the amount of meta data to be moved (rewritten) in order to acquire unoccupied meta blocks) (step 1404).

Based on the meta RCM amount calculated in step 1404, the CPU 0106 performs meta RCM to acquire unoccupied meta blocks (step 1405). Subsequently, the CPU 0106 proceeds to step 1406 (P).

(P)

Based on the user RCM amount calculated in step 1401, the CPU 0106 performs user RCM to acquire unoccupied user blocks, and then terminates the process (step 1406). If step 1401 is not performed, this process is not performed.

According to the above-described RCM control process, the CPU 0106 is able to perform meta RCM without affecting allocated user blocks by first calculating the user RCM amount and then calculating the meta RCM amount based on the user RCM amount. Subsequently, the CPU 0106 is able to prevent the depletion of unoccupied meta blocks by performing user RCM.

Figure 16:
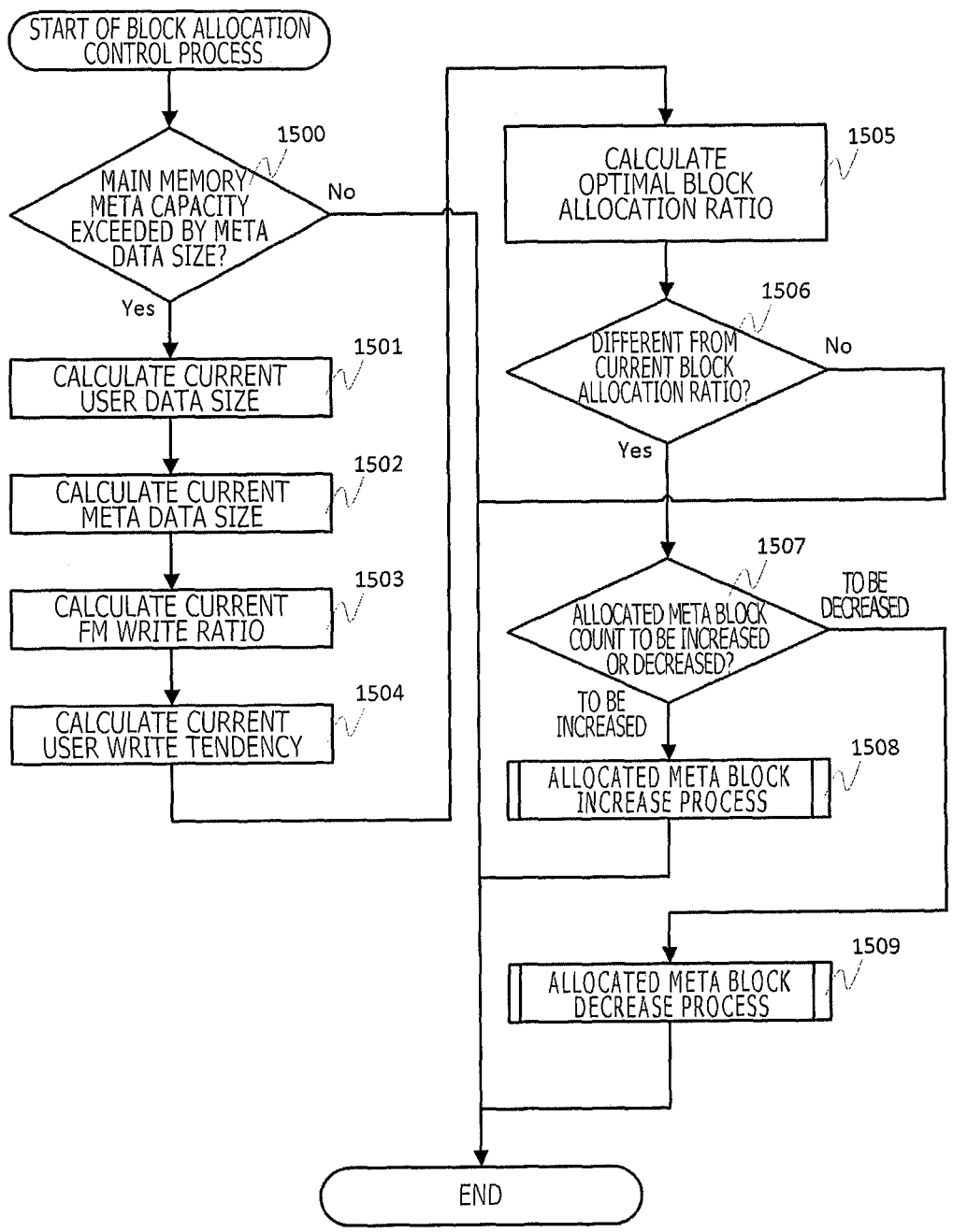
FIG. 16 is a flowchart illustrating an example of a block allocation control process.

FIG. 16 is a flowchart illustrating an example of the block allocation control process.

In step 1303 of the above-described block control process, the CPU 0106 performs the block allocation control process.

Based on the information acquired in step 1300, the CPU 0106 determines whether the main memory meta capacity 0802 is exceeded by the meta data size 0805 (step 1500). If the result of determination indicates that the main memory meta capacity 0802 is exceeded by the meta data size 0805 ("YES" at step 1500), the CPU 0106 proceeds to step 1501 (R). If, by contrast, the meta data size 0805 is not larger than the main memory meta capacity 0802 ("NO" at step 1500), the CPU 0106 terminates the process.

(R)

The CPU 0106 calculates the current user data size 0902 (step 1501).

The CPU 0106 calculates the current meta data size 0903 (step 1502).

The CPU 0106 calculates the current FM write ratio 0904 (step 1503).

The CPU 0106 calculates the current user write tendency 0905 (step 1504).

Based on the values calculated in steps 1501 to 1504, the CPU 0106 calculates, as an optimal block allocation ratio, a block allocation ratio between user data and meta data that minimizes the total FM write amount (step 1505). The block allocation ratio is the ratio between the number of allocated user blocks and the number of allocated meta blocks. Here, the CPU 0106 may, for example, retain in the main memory 0104 a table indicating a value combination of the user data size, meta data size, FM write ratio, user write tendency, and optimal block allocation ratio, and reference the table to determine the optimal block allocation ratio corresponding to the values calculated in steps 1501 to 1504. The block allocation ratio may be the ratio of the number of allocated meta blocks to the total number of blocks in the FM 0102. Instead of the block allocation ratio, either the number of allocated meta blocks or the number of allocated user blocks may be used. The CPU 0106 may use a preset calculation formula to determine the optimal block allocation ratio from the values calculated in steps 1501 to 1504.

The CPU 0106 obtains the current block allocation ratio based on the information acquired in step 1300, and determines whether the optimal block allocation ratio is different from the current block allocation ratio (step 1506). If, for example, the ratio between the optimal block allocation ratio and the current block allocation ratio is outside a preset range, the CPU 0106 determines that the optimal block allocation ratio is different from the current block allocation ratio. If the result of determination indicates that the optimal block allocation ratio is different from the current block allocation ratio ("YES" at step 1506), the CPU 0106 proceeds to step 1507 (S). If, by contrast, the optimal block allocation ratio is not different from the current block allocation ratio ("NO" at step 1506), the CPU 0106 terminates the process.

(S)

Based on the result obtained in step 1506, the CPU 0106 determines whether the total FM write amount can be minimized by increasing or decreasing the number of allocated meta blocks (step 1507). Here, if the number of allocated meta blocks determined by the optimal block allocation ratio is regarded as the optimal number of allocated meta blocks and the number of meta blocks to be changed, which is determined by subtracting the current number of allocated meta blocks from the optimal number of allocated meta blocks, is positive, the CPU 0106 determines that the number of allocated meta blocks should be increased. If the result of determination indicates that the number of allocated meta blocks should be increased ("TO BE INCREASED" at step 1507), the CPU 0106 proceeds to step 1508 (T). If, by contrast, the number of allocated meta blocks should be decreased ("TO BE DECREASED" at step 1507), the CPU 0106 proceeds to step 1509 (U).

(T)

The CPU 0106 performs an allocated meta block increase process to increase the number of allocated meta blocks, and then terminates the process (step 1508). This process will be described in detail later.

(U)

The CPU 0106 performs an allocated meta block decrease process to decrease the number of allocated meta blocks, and then terminates the process (step 1509). This process will be described in detail later.

According to the above-described block allocation control process, the CPU 0106 is able to calculate the optimal block allocation ratio based on the status of the SSD 0100. Further, if the current block allocation ratio is different from the optimal block allocation ratio, the CPU 0106 is able to make the current block allocation ratio closer to the optimal block allocation ratio. Furthermore, the CPU 0106 is able to calculate the optimal block allocation ratio for minimizing the total FM write amount by using measured values, such as those included in the device information TBL 0212 and the statistical information TBL 0213, and the relationship between the measured values and the optimal block allocation ratio. Moreover, minimizing the total FM write amount prevents the depletion of unoccupied blocks, improves the performance of the SSD 0100, and increases the life of the FM 0102.

Instead of the block allocation ratio, the number of allocated meta blocks or the number of allocated user blocks may be used. Further, instead of the optimal block allocation ratio, the optimal number of allocated meta blocks or the optimal number of allocated user blocks may be used.

Figure 17:
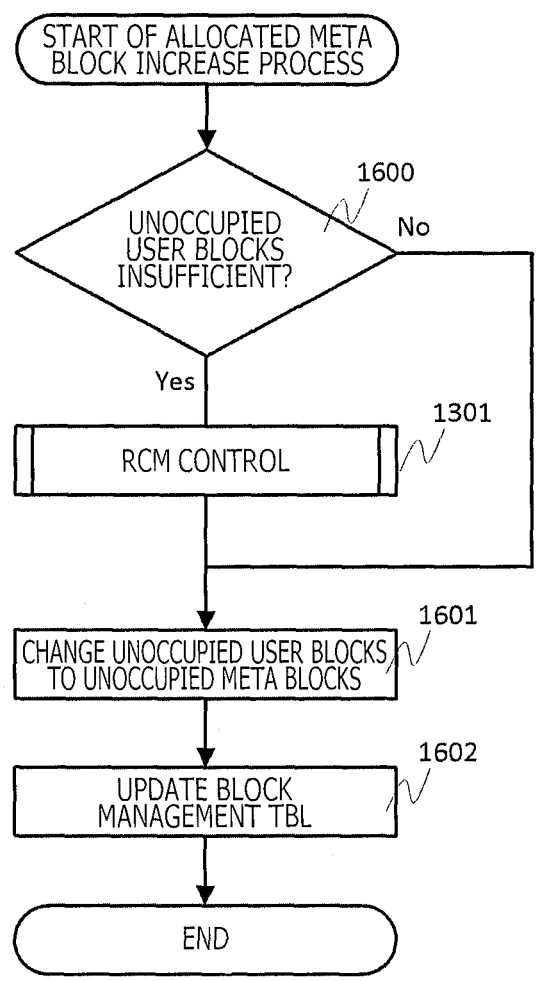
FIG. 17 is a flowchart illustrating an example of an allocated meta block increase process.

FIG. 17 is a flowchart illustrating an example of the allocated meta block increase process.

In step 1508 of the above-described block allocation control process, the CPU 0106 performs the allocated meta block increase process.

After blocks to be added are acquired from unoccupied user blocks in order to increase the number of allocated meta blocks by the number of blocks to be changed, the CPU 0106 determines whether the number of unoccupied user blocks is insufficient (step 1600). Here, if the number of post-change unoccupied user blocks, which is calculated by subtracting the number of blocks to be changed from the current number of unoccupied user blocks, is smaller than the unoccupied user block count threshold value, the CPU 0106 determines that the number of unoccupied user blocks is insufficient. If the result of determination indicates that the number of unoccupied user blocks is insufficient ("YES" at step 1600), the CPU 0106 proceeds to step 1301 (W). If, by contrast, the number of unoccupied user blocks is not insufficient ("NO" at step 1600), the CPU 0106 proceeds to step 1601 (X).

(W)

The CPU 0106 regards the number of blocks to be changed as the number of blocks to be used and performs the above-described RCM control process in order to generate unoccupied user blocks (step 1301). Subsequently, the CPU 0106 proceeds to step 1601 (X).

(X)

The CPU 0106 changes unoccupied user blocks corresponding to the number of blocks to be changed, to unoccupied meta blocks (step 1601).

The CPU 0106 updates information in the block management TBL 0211 that relates to the blocks changed in step 1601, and then terminates the process (step 1602).

According to the above-described allocated meta block increase process, the CPU 0106 is able to increase the number of allocated meta blocks by changing unoccupied user blocks to unoccupied meta blocks.

Figure 18:
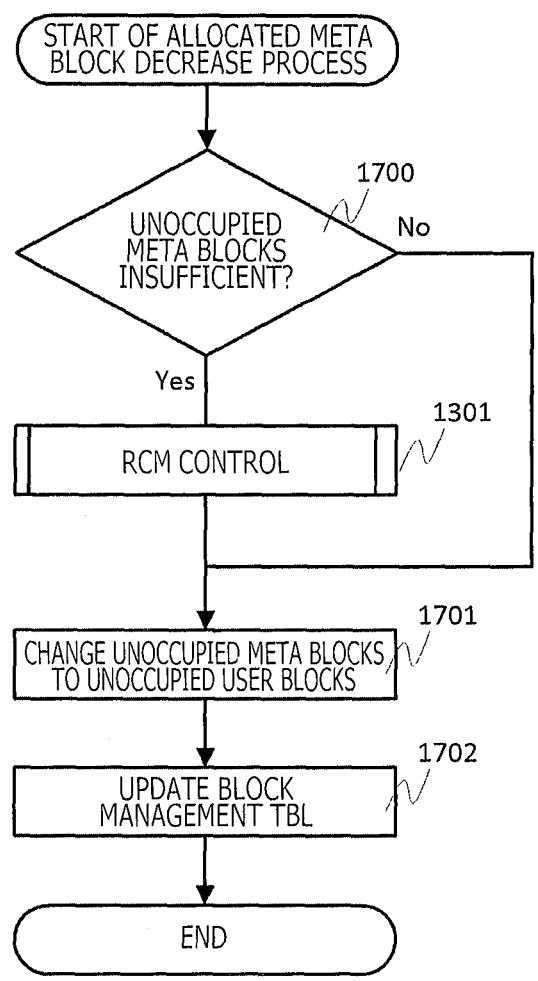
FIG. 18 is a flowchart illustrating an example of an allocated meta block decrease process.

FIG. 18 is a flowchart illustrating an example of the allocated meta block decrease process.

In step 1509 of the above-described block allocation control process, the CPU 0106 performs the allocated meta block decrease process.

After blocks to be removed are acquired from unoccupied meta blocks in order to decrease the number of allocated meta blocks by the number of blocks to be changed, the CPU 0106 determines whether the number of unoccupied meta blocks is insufficient (step 1700). Here, if the number of post-change unoccupied meta blocks, which is calculated by subtracting the number of blocks to be changed from the current number of unoccupied meta blocks, is smaller than the unoccupied user block count threshold value, the CPU 0106 determines that the number of unoccupied meta blocks is insufficient. If the result of determination indicates that the number of unoccupied meta blocks is insufficient ("YES" at step 1700), the CPU 0106 proceeds to step 1301 (Y). If, by contrast, the number of unoccupied meta blocks is not insufficient ("NO" at step 1700), the CPU 0106 proceeds to step 1701 (Z).

(Y)

The CPU 0106 regards the number of blocks to be changed as the number of blocks to be used and performs the above-described RCM control process in order to generate unoccupied meta blocks (step 1301). Subsequently, the CPU 0106 proceeds to step 1701 (Z).

(Z)

The CPU 0106 changes unoccupied meta blocks corresponding to the number of blocks to be changed, to unoccupied user blocks (step 1701).

The CPU 0106 updates information in the block management TBL 0211 that relates to the blocks changed in step 1701, and then terminates the process (step 1702).

According to the above-described allocated meta block decrease process, the CPU 0106 is able to decrease the number of allocated meta blocks by changing unoccupied meta blocks to unoccupied user blocks.

The present embodiment is able to perform a continuous I/O operation in an SSD having a data compression function without causing the depletion of unoccupied blocks. Further, the present embodiment is able to dynamically change the number of blocks to be allocated to user data and meta data in order to decrease the amount of valid data movement that occurs during user RCM and meta RCM. If, for example, the amount of meta data write accounts for a high percentage of the total FM write amount, the percentage of valid data included in each block of meta data can be decreased by increasing the number of blocks to be allocated to meta data. This decreases the amount of valid data movement during RCM. That is to say, the total FM write amount can be decreased to improve device performance and device life.

Instead of the data compression function, the SSD 0100 may have a deduplication function or other data reduction function cable of writing into the FM 0102 by decreasing the amount of write data from the higher-level device 0108. The above-mentioned data reduction function changes the logical address space of the SSD 0100 and thus changes the amount of meta data. Further, the data reduction function reduces the bit cost by providing the higher-level device 0108 with a logical address space that is larger than a physical address space determined by the number of allocated user blocks.

The terms will now be described. A storage device corresponds, for example, to the SSD 0100. A main memory corresponds, for example, to the main memory 0104. A nonvolatile semiconductor memory corresponds, for example, to the FM 0102. A processor corresponds, for example, to the CPU 0106. An unoccupied user block generation process corresponds, for example, to the user RCM. An unoccupied meta block generation process corresponds, for example, to the meta RCM. An amount of user data movement corresponds, for example, to the user RCM amount. An amount of meta data movement corresponds, for example, to the meta RCM amount. Allocation information corresponds, for example, the block allocation ratio, the number of allocated meta blocks, and the number of allocated user blocks. Optimal allocation information corresponds, for example, to the optimal block allocation ratio, the optimal number of allocated meta blocks, and the optimal number of allocated user blocks. An allocated block change process corresponds, for example, to the block allocation control process. A change condition corresponds, for example, to the condition in step 1302. A measured value corresponds, for example, to a certain value in the device information TBL 0212 or the statistical information TBL 0213.

While the present invention has been described in conjunction with a particular embodiment, the particular embodiment is merely illustrative and not restrictive, and the scope of the present invention is not limited to the above-described configuration. Persons of skill in the art will appreciate that the present invention may be implemented in various other embodiments.

DESCRIPTION OF REFERENCE CHARACTERS

0100: SSD
0101: SSD controller
0102: FM
0103: Storage I/F
0104: Main memory
0105: FM controller
0106: CPU
0107: Internal network
0108: Higher-level device
0300: Logical address space
0301: Physical address space
0302: Logical page
0303: Block
0304: Page

The invention claimed is:

1. A storage device comprising:
a main memory;
a nonvolatile semiconductor memory; and
a processor connected to the main memory and the nonvolatile semiconductor memory, wherein:
the processor stores in the nonvolatile semiconductor memory at least part of meta data indicative of the relationship between logical addresses provided to a higher-level device and physical addresses of user data in the nonvolatile semiconductor memory, and stores part of the meta data in the main memory;
the processor allocates blocks in the nonvolatile semiconductor memory as allocated user blocks for storing the user data and as allocated meta blocks for storing the meta data;
the processor is capable of performing an unoccupied user block generation process and an unoccupied meta block generation process, the unoccupied user block generation process being adapted to move user data stored in the allocated user blocks in order to generate unoccupied user blocks serving as unoccupied blocks among the allocated user blocks, the unoccupied meta block generation process being adapted to move meta data stored in the allocated meta blocks in order to generate unoccupied meta blocks serving as unoccupied blocks among the allocated meta blocks;
the processor calculates the number of unoccupied meta blocks to be consumed, that is, the number of unoccupied meta blocks to be consumed by the unoccupied user block generation process; and
the processor performs the unoccupied meta block generation process based on the number of unoccupied meta blocks to be consumed.

2. The storage device according to claim 1, wherein the processor receives write data from the higher-level device, generates user data by decreasing the amount of the write data, and writes the generated user data into the allocated user blocks.

3. The storage device according to claim 2, wherein:
the processor determines whether the unoccupied user blocks are insufficient;
if the unoccupied user blocks are determined to be insufficient, the processor calculates the amount of user data movement indicative of the amount of user data to be moved by the unoccupied user block generation process;
based on the amount of user data movement, the processor calculates the number of unoccupied meta blocks to be consumed;

based on the number of unoccupied meta blocks to be consumed, the processor determines whether the unoccupied meta blocks are insufficient; and
if the unoccupied meta blocks are determined to be insufficient, the processor performs the unoccupied meta block generation process and then performs the unoccupied user block generation process.

4. The storage device according to claim 3, wherein:
the processor acquires a measured value by measuring a write into the nonvolatile semiconductor memory; and
based on the measured value, the processor performs an allocated block change process of changing the number of allocated user blocks and the number of allocated meta blocks.

5. The storage device according to claim 4, wherein, based on the measured value, the allocated block change process is performed on allocation information indicative of the number of allocated user blocks and the number of allocated meta blocks to determine optimal allocation information and change the allocation information in accordance with the optimal allocation information, the optimal allocation information being the allocation information for minimizing the amount of write into the nonvolatile semiconductor memory.

6. The storage device according to claim 5, wherein the allocated block change process changes unoccupied user blocks to unoccupied meta blocks when increasing the number of allocated meta blocks, and changes unoccupied meta blocks to unoccupied user blocks when decreasing the number of allocated meta blocks.

7. The storage device according to claim 6, wherein:
the measured value includes the size of user data stored in the nonvolatile semiconductor memory, the size of meta data stored in the nonvolatile semiconductor memory, the amount of user data write into the nonvolatile semiconductor memory, the amount of meta data write into the nonvolatile semiconductor memory, or the I/O pattern of user data; and
the allocated block change process uses a predefined relationship between the measured value and the optimal allocation information to determine the optimal allocation information from the measured value.

8. The storage device according to claim 7, wherein:
the processor repeatedly acquires the measured value, and determines whether a predefined change condition is satisfied by a change in the measured value; and
if the change condition is determined to be satisfied by the change in the measured value, the processor performs the allocated block change process.

9. The storage device according to claim 8, wherein:
the processor divides the space of the logical addresses into a plurality of sections and divides the meta data into a plurality of subsets corresponding to the plurality of sections;
the processor stores subset position information in the main memory, the subset position information showing positions that are within the main memory or the nonvolatile semiconductor memory and used to store the subsets; and
when accessing specific user data, the processor performs a subset position acquisition process based on the subset position information in order to acquire the position of a subset corresponding to the specific user data.

10. The storage device according to claim 9, wherein:
the processor stores block management information in the main memory, the block management information indicating the status of each block in the nonvolatile semiconductor memory; and upon receiving the write data that is to be written at a first logical address from the higher-level device, the processor performs the subset position acquisition process to acquire the position of a subset corresponding to the first logical address, selects the physical address of a write destination for user data in accordance with the write data, writes generated user data at the write destination, and causes the subset corresponding to the first logical address to reflect the relationship between the first logical address and the physical address of the write destination.

11. The storage device according to claim 10, wherein the processor compresses the write data to generate user data based on the write data.

12. The storage device according to claim 11, wherein, upon receiving a request for unmapping a second logical address from the higher-level device, the processor performs the subset position acquisition process to acquire the position of a subset corresponding to the second logical address and, based on the subset corresponding to the second logical address, causes the subset corresponding to the second logical address to reflect the release of a physical address from the second logical address.

13. A storage device control method for controlling a storage device including a main memory and a nonvolatile semiconductor memory, the storage device control method comprising the steps of:

storing in the nonvolatile semiconductor memory at least part of meta data indicative of the relationship between logical addresses provided to a higher-level device and physical addresses of user data in the nonvolatile semiconductor memory, and storing part of the meta data in the main memory;

allocating blocks in the nonvolatile semiconductor memory as allocated user blocks for storing the user data and as allocated meta blocks for storing the meta data;

performing an unoccupied user block generation process by moving user data stored in the allocated user blocks in order to generate unoccupied user blocks serving as unoccupied blocks among the allocated user blocks, and performing an unoccupied meta block generation process by moving meta data stored in the allocated meta blocks in order to generate unoccupied meta blocks serving as unoccupied blocks among the allocated meta blocks;

calculating the number of unoccupied meta blocks to be consumed, that is, the number of unoccupied meta blocks to be consumed by the unoccupied user block generation process; and performing the unoccupied meta block generation process based on the number of unoccupied meta blocks to be consumed.

* * * * *